US012247613B2

(12) United States Patent
Kwon et al.

(10) Patent No.: US 12,247,613 B2
(45) Date of Patent: Mar. 11, 2025

(54) BALL SPLINE HAVING REINFORCEMENT BUSH PART

(71) Applicant: WON ST CO., LTD., Hwaseong-si (KR)

(72) Inventors: Hyeok Do Kwon, Siheung-si (KR); Taek Won Lee, Seoul (KR); Gi Dong Son, Incheon (KR); Dong Hyup Nam, Siheung-si (KR)

(73) Assignee: WON ST CO., LTD., Hwaseong-si (KR)

( * ) Notice: Subject to any disclaimer, the term of this patent is extended or adjusted under 35 U.S.C. 154(b) by 122 days.

(21) Appl. No.: 17/923,584

(22) PCT Filed: Apr. 27, 2021

(86) PCT No.: PCT/KR2021/005281
§ 371 (c)(1),
(2) Date: Nov. 6, 2022

(87) PCT Pub. No.: WO2021/225319
PCT Pub. Date: Nov. 11, 2021

(65) Prior Publication Data
US 2023/0204069 A1 Jun. 29, 2023

(30) Foreign Application Priority Data
May 6, 2020 (KR) .................. 10-2020-0053621

(51) Int. Cl.
*F16C 29/06* (2006.01)
(52) U.S. Cl.
CPC ................ *F16C 29/0695* (2013.01)
(58) Field of Classification Search
CPC ............ F16C 29/068; F16C 29/0683; F16C 29/0685; F16C 29/0688; F16C 29/0692;
(Continued)

(56) References Cited

U.S. PATENT DOCUMENTS

| 4,312,545 A | 1/1982 | Blaurock et al. |
| 4,936,692 A * | 6/1990 | Tanaka ................ F16C 29/0695 384/43 |

(Continued)

FOREIGN PATENT DOCUMENTS

| EP | 1 236 913 A1 | 9/2002 |
| JP | 09-133131 A | 5/1997 |

(Continued)

OTHER PUBLICATIONS

Search Report, mailed Jul. 23, 2021, for International Application No. PCT/KR2021/005281.

(Continued)

*Primary Examiner* — James Pilkington
(74) *Attorney, Agent, or Firm* — LRK Patent Law Firm

(57) ABSTRACT

A ball spline having reinforcement bush parts includes a spline shaft having concave track grooves formed to extend along the longitudinal direction thereof; a nut part in which the spline shaft is inserted and movable along the longitudinal direction thereof; and a plurality of balls provided between the nut part and the spline shaft to circulate, wherein: the nut part includes a nut which is a hollow body where the spline shaft is inserted, and retainers which are hollow bodies which are provided at longitudinally opposite sides of the nut and into which the spline shaft is inserted; two spline parts and two reinforcement bush parts are provided at the nut part; some of the balls circulate and move between a track groove and a load track groove and along a no-load circulation part; and the remainder of the balls roll circulate and move along the reinforcement bush parts.

2 Claims, 4 Drawing Sheets

(58) Field of Classification Search
CPC .............. F16C 29/0695; F16C 29/0697; F16C 29/084
See application file for complete search history.

(56) References Cited

U.S. PATENT DOCUMENTS

| | | | | |
|---|---|---|---|---|
| 5,695,288 | A * | 12/1997 | Sugihara | F16C 29/0688 384/44 |
| 6,760,980 | B1 * | 7/2004 | Golinelli | F16C 29/0695 33/832 |
| 7,637,662 | B2 * | 12/2009 | Kato | F16C 29/0685 384/43 |
| 2023/0160423 | A1 * | 5/2023 | Lee | F16C 29/0695 384/45 |

FOREIGN PATENT DOCUMENTS

| | | | |
|---|---|---|---|
| JP | 2011-169437 | A | 9/2011 |
| KR | 10-0380164 | B1 | 4/2003 |
| KR | 20-0393286 | Y1 | 8/2005 |

OTHER PUBLICATIONS

Written Opinion, mailed Jul. 23, 2021, for International Application No. PCT/KR2021/005281.

* cited by examiner

BALL SPLINE HAVING REINFORCEMENT BUSH PART

BACKGROUND

1. Field of the Invention

The present invention relates to a ball spline and, more particularly, to a ball spline having reinforcement bush parts for improving the rigidity of a spline shaft, thereby extending the lifespan thereof.

2. Description of Related Art

The ball spline is a kind of linear motion bearing that accurately transmits linear motion in the automation industry and semiconductor industry.

As shown in FIG. 1, the conventional ball spline 10 has a load track groove 2, in which balls 1 are accommodated and one side of the balls 1 is exposed, wherein as the balls 1 circulating along the load track groove 2 enter a no-load circulation hole 5 along a circulation groove 4 of a retainer 3, a continuous track is formed so that the balls 1 circulate.

In a nut 6, the load track groove 2 in which the balls 1 are accommodated may be formed in an arc shape in which the radius of curvature of the cross section thereof is larger than the radius of the balls 1. However, it is also possible to carry out processing so as to form two identical arcs on the left and right of the central axis of a circle in the center and then accommodate the balls 1 so that the balls 1 can be respectively brought into contact with the load track groove 2 at two contact points formed on the left and right of the central axis of the circle in the center. When the balls 1 are accommodated in the load track groove 2, the two contact points where the balls 1 come into contact increase a separation angle between the centers of the balls 1 while preventing the balls 1 from falling out of the load track groove 2. In addition, a curved surface is formed at the tip of the load track groove 2 so as to allow smooth circulation of the balls 1 when the balls 1 move in the load track groove 2 to the no-load circulation hole 5 along the circulation groove 4 of the retainer 3. The balls 1 move along the curved surface when moving, so no impact is generated and no noise or vibration is generated.

A spline shaft 8 is formed with a track groove 9 which is concave and extends in the longitudinal direction so that when the spline shaft 8 is inserted into the nut 6, the balls 1 protruding to the inner diameter of the nut 6 are inserted into the track groove 9. Therefore, the spline shaft 8 can be precisely moved back and forth by the balls 1 on the nut 6. The circulation of the balls 1 allows the spline shaft 8 to move back and forth regardless of the length of the spline shaft 8.

The track groove 9 formed on the spline shaft 8 can also have an arc-shaped cross section, but by processing the track groove 9 in the same way as the load track groove 2, the balls 1 roll in contact with the track groove 9 at 4 contact points (four-point contact).

In FIG. 1, reference numeral 7 indicates a seal provided between the nut 6 and the retainer 3, and 4a indicates an inwardly protruding circulation protrusion provided in the retainer 3.

In the ball spline 10 as shown in FIG. 1, the nut 6 to which the retainer 3 is coupled can reciprocate in the longitudinal direction thereof along the spline shaft 8, but cannot rotate with respect to the spline shaft 8.

FIG. 2 is a cross-sectional view showing the spline shaft and balls of the ball spline.

The conventional ball spline 10 has problems in that when a load is applied in direction "A" of FIG. 2, the deformation angle of the nut 6 increases, pressure is applied to contact points 9a between the balls 1 and the track groove 9 at the lower portion of the track groove 9, and the stiffness of the spline shaft 8 is weakened, so that the ball spline 10 vibrates and the lifespan is shortened.

If any additional track groove 9 is further formed on the spline shaft 8 in order to solve the problems, there are problems in that the rigidity of the spline shaft 8 is weakened and the cost for forming the additional track groove 9 is added.

SUMMARY OF THE INVENTION

The present invention has been proposed to solve the problems of the prior art as described above, and an object of the present invention is to provide a ball spline having reinforcement bush parts, in which reinforcement bush parts are provided so as to prevent damage to a track groove due to contact between a spline shaft and balls and the rigidity of the spline shaft is increased so as to extend the lifespan thereof.

In order to achieve the objects as above, the present invention provides a ball spline having reinforcement bush parts, comprising a rod-shaped spline shaft having at least one concave track groove formed to extend in the longitudinal direction thereof, a nut part in which the spline shaft is inserted so that the nut part can move in the longitudinal direction of the spline shaft, and a plurality of balls provided between the nut part and the spline shaft so as to circulate, wherein: the nut part includes a nut which is a hollow body into which the spline shaft is inserted, and retainers, which are hollow bodies provided at both sides of the nut in the longitudinal direction of the nut and into which the spline shaft is inserted;

the nut part is provided with spline parts; the spline part includes a concave load track groove, which is formed in the longitudinal direction on the inner surface part of the nut so as to face the track groove, a no-load circulation part formed in parallel to the load track groove in the longitudinal direction, and a curved concave spline circulation groove, which is formed in each of the retainers and has one side facing the end portion of the load track groove and the other side facing the end portion of the no-load circulation part; some of the balls are diverted in spline circulation grooves of the retainers which are provided on both sides in the longitudinal direction and circulate and move between the track groove and the load track groove and along the no-load circulation part;

the nut part further includes two reinforcement bush parts in parallel with the spline part; and the remainder of the balls rolls in contact with the outer surface of the spline shaft and circulate and move along the reinforcement bush parts.

Herein, a plurality of track grooves is provided, a plurality of spline parts and a plurality of reinforcement bush parts are provided, respectively, and the spline parts and the reinforcement bush parts are provided alternately.

Herein, two track grooves are provided and opposite to each other, two spline parts are provided, and two reinforcement bush parts are provided and positioned between the spline parts.

Herein, each of the reinforcement bush parts includes a concave bush track groove, which is formed in the longitudinal direction on the inner surface part of the nut so as to face the outer surface of the spline shaft, a bush circulation part formed in parallel to the bush track groove in the longitudinal direction, and a curved concave bush circulation groove, which is formed in each of the retainers and has one side facing the end portion of the bush track groove and the other side facing the end portion of the bush circulation part; and the plurality of balls that circulate and move along the reinforcement bush parts are diverted in the bush circulation grooves of the retainers which are provided on both sides in the longitudinal direction and circulate and move between the outer surface of the spline shaft and the bush track grooves and along the bush circulation parts.

Herein, assembly is carried out such that preload applied to the balls between the outer surface of the spline shaft and the bush track grooves is to be smaller than preload applied to the balls between the track grooves and the load track grooves.

Advantageous Effect of the Invention

According to the present invention, the ball spline having reinforcement bush parts is provided with reinforcement bush parts for supporting the load applied in the radial direction of the nut with the balls of the reinforcement bush parts, wherein pressure is not generated between the track groove and the balls so that the track groove is prevented from being damaged due to the contact of the spline shaft and the balls and the spline shaft is prevented from being deformed, thereby improving the life of the ball spline.

DETAILED DESCRIPTION OF THE INVENTION

Hereinafter, a ball spline having reinforcement bush parts according to the present invention will be described in detail with reference to the accompanying drawings.

Figure 3:
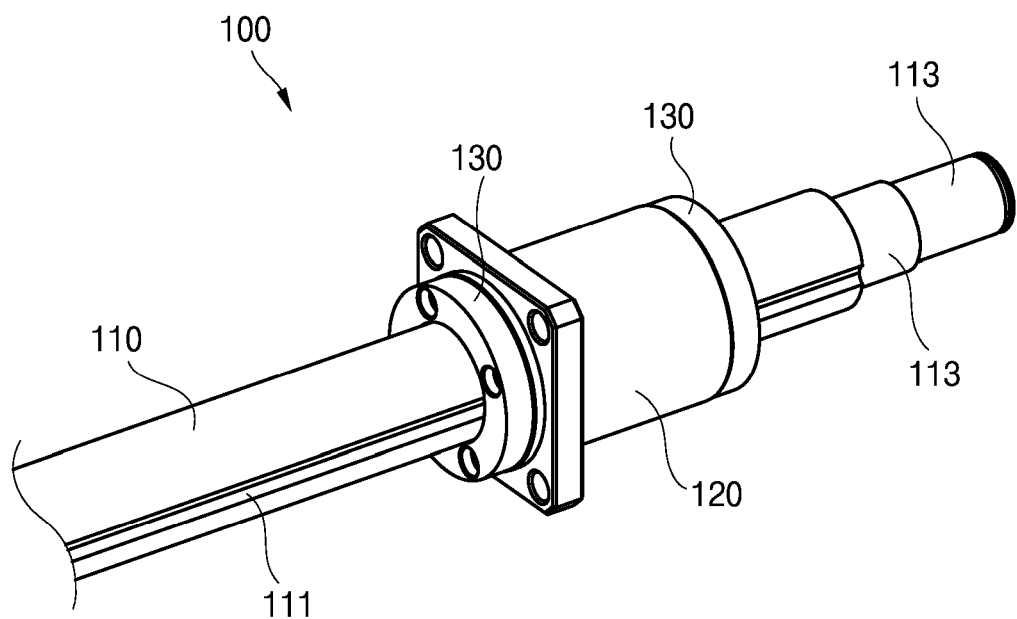
FIG. 3 is a partially omitted perspective view showing a ball spline having reinforcement bush parts according to the present invention.
Figure 4:
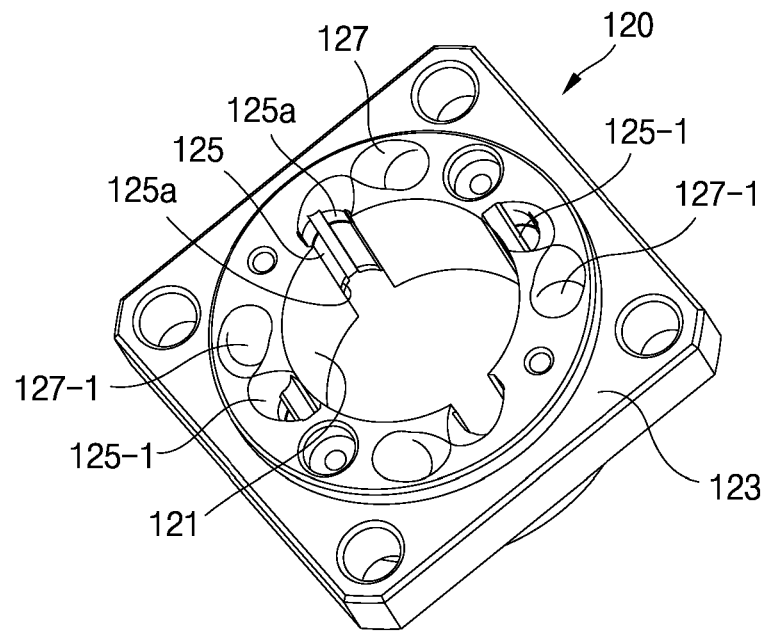
FIG. 4 is a perspective view showing a nut included in the ball spline according to the present invention.
Figure 5:
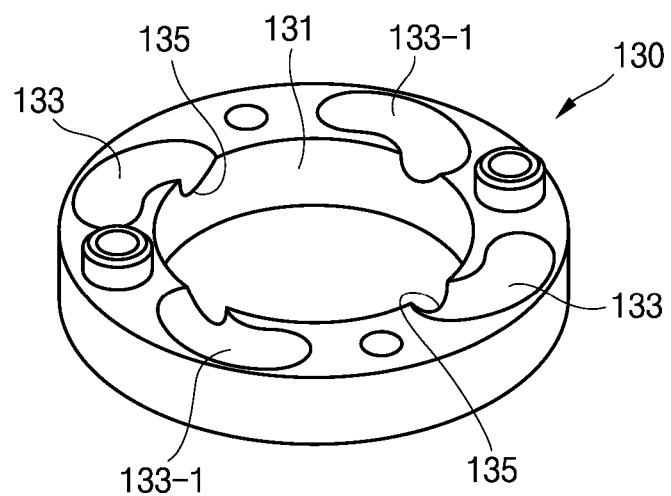
FIG. 5 is a perspective view showing a retainer included in the ball spline according to the present invention.
Figure 6:
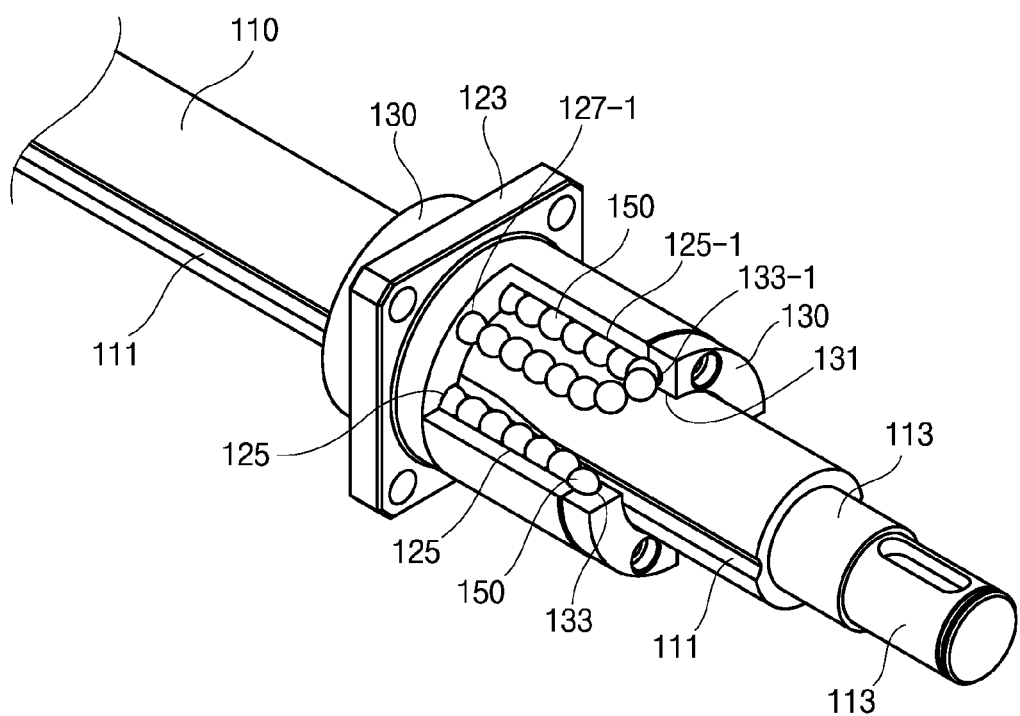
FIG. 6 is a partially cut-away perspective view showing a modified example of a ball spline according to the present invention.
Figure 7:
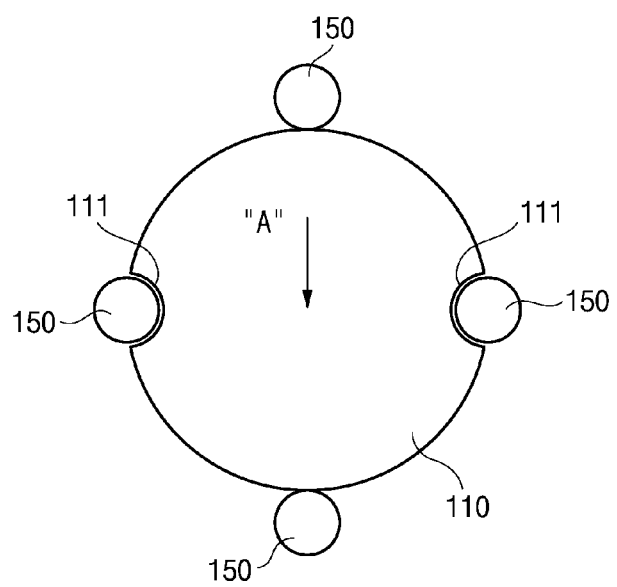
FIG. 7 is a cross-sectional view showing a spline shaft and balls in the ball spline according to the present invention.

FIG. 3 is a partially omitted perspective view showing a ball spline having reinforcement bush parts according to the present invention, FIG. 4 is a perspective view showing a nut included in the ball spline according to the present invention, FIG. 5 is a perspective view showing a retainer included in the ball spline according to the present invention, FIG. 6 is a partially cut-away perspective view showing a modified example of a ball spline according to the present invention, and FIG. 7 is a cross-sectional view showing a spline shaft and balls in the ball spline according to the present invention.

Hereinafter, the extension direction of a spline shaft 110 in FIG. 3 is described as "longitudinal direction".

As shown in FIG. 3, the ball spline 100 having reinforcement bush parts according to the present invention includes a rod-shaped spline shaft 110, a nut part into which the spline shaft 110 is inserted so that the nut part can move in the longitudinal direction of the spline shaft 110, and a plurality of balls 150 provided between the nut part and the spline shaft 110 so as to circulate.

The nut part includes a nut 120 which is a hollow body into which the spline shaft 110 is inserted, and retainers 130, which are hollow bodies and provided at both sides of the nut 120 in the longitudinal direction of the nut 120 and into which the spline shaft 110 is inserted. The nut part may further include ring-shaped seals between the nut 120 and the retainers 130, as indicated by reference numeral 7 in FIG. 1.

The nut 120 is made of high carbon steel such as bearing steel. In FIG. 4, reference numeral 123 indicates a flange protruding radially outward from one or both end portions of the nut 120 in the longitudinal direction of the nut 120.

Figure 1:
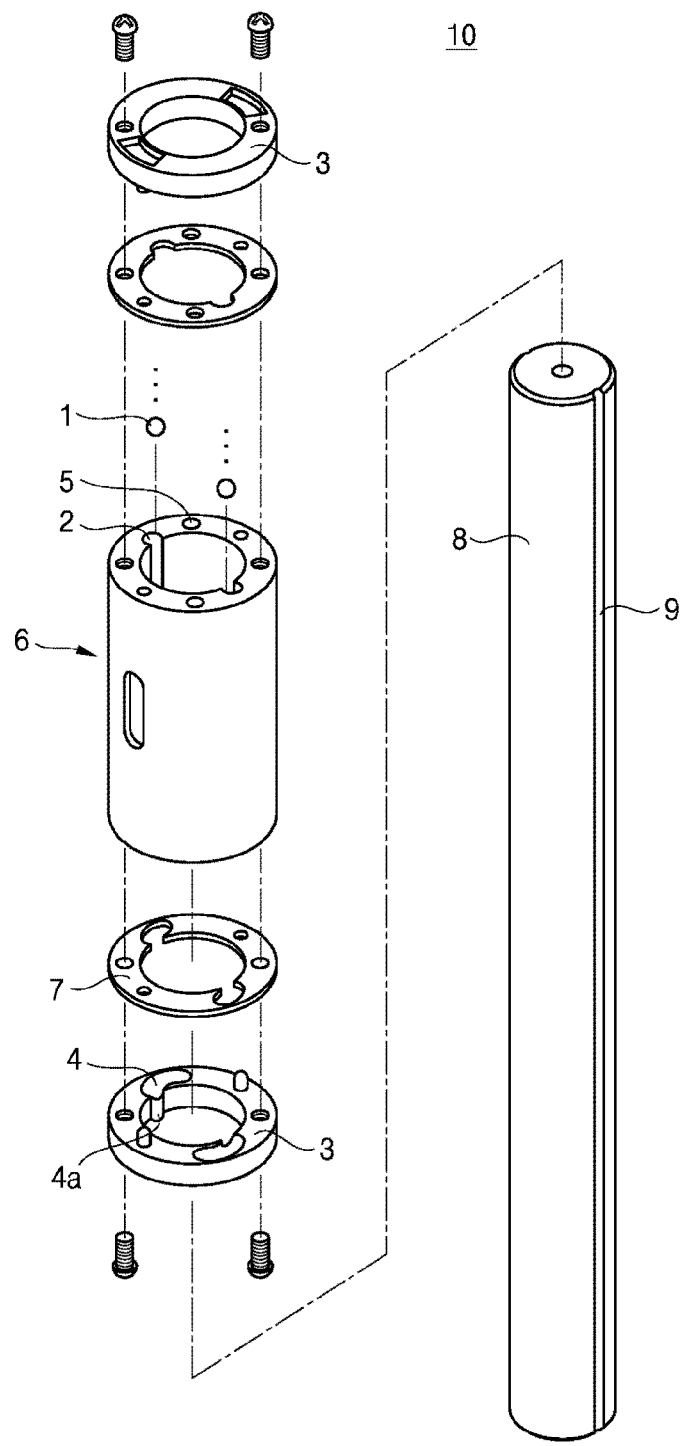
FIG. 1 is an exploded perspective view showing a prior art ball spline.

The retainer 130 has a doughnut shape in which an inner diameter portion is removed from a disk. The retainer 130 may be made of engineering plastics (nylon 6, nylon 66, or glass fibers included therein), and may be made of a metal such as bearing steel like the nut 120. A seal that is a hollow body (not shown) may be provided between the nut 120 and the retainer 130. The retainer 130 may be coupled to the nut 120 by means of bolts as shown in FIG. 1.

Figure 2:
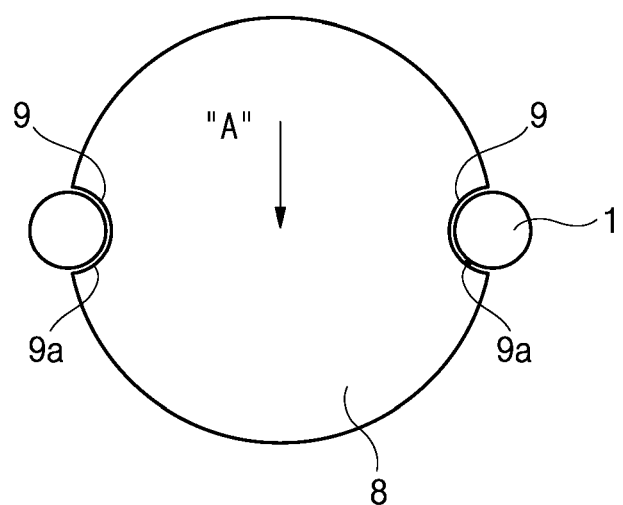
FIG. 2 is a cross-sectional view showing a spline shaft and balls of the prior art ball spline.

The spline shaft 110 is formed with at least one concave track groove 111 that extends in the longitudinal direction thereof. The spline shaft 110 may be manufactured by processing the concave track groove 111 on the outer surface of a rod having a circular cross section. A plurality of the track grooves 111 are formed to be spaced apart from each other in the circumferential direction. As shown in FIG. 2, two track grooves 111 may be provided at positions opposite to each other. The spline shaft 110 may include a shaft mounting part 113 having a reduced diameter at an end thereof. The shaft mounting portion 113 is formed with a key groove (not shown) and mounted with a pinion or the like.

The nut part is provided with two spline parts and two reinforcement bush parts, respectively.

The spline part includes at least one concave load track groove 125 formed in the longitudinal direction on the inner surface part 121 of the nut 120, which is a hollow part into which the spline shaft 110 is inserted, and at least one no-load circulation part 127 formed in parallel to the load track groove 125 in the longitudinal direction. The load track groove 125 and the no-load circulation part 127 are provided in the same number as the track groove 111 provided on the spline shaft 110. The no-load circulation part 127 may be formed as a through hole formed in the nut 120 in the longitudinal direction of the nut 120. The load track groove 125 is formed at a position facing the track groove 111.

A curvedly concave spline circulation groove 133 is formed on the inner surface of each of the retainers 130, which faces the nut 120. At least one spline circulation groove 133 is formed. The spline circulation groove 133 is formed in the same number as the track groove 111. One side of the spline circulation groove 133 faces the end portion of the load track groove 125 and the other side faces the end portion of the no-load circulation part 127.

Some of the balls 150 are diverted in the spline circulation grooves 133 of the retainers 130, which are provided on both sides in the longitudinal direction, and roll between the track groove 111 and the load track groove 125 and circulate and move along the no-load circulation part 127. Since the circulation of the balls 150 is a known technique, a description thereof will be omitted.

The balls 150 may come into contact with the track groove 111 at two points and come into contact with the load track groove 125 at two points, thereby rolling in a four-point contact. The track groove 111 and the load track groove 125 may be formed in the shape of an arc having a radius of curvature larger than the radius of the balls 150, so that the balls 150 can roll in a two-point contact, which is a conventionally known technique, so a detailed description thereof will be omitted.

As shown in FIG. 4, extended track extension parts 125a are formed at both end portions of the load track groove 125 in the longitudinal direction. When the balls 150 move and reach the track extension parts 125a, a clearance for the balls 150 between the track extension parts 125a and the track groove 111 increases so that the balls 150 can smoothly move to the spline circulation grooves 133 of the retainers 130 and, accordingly, damage to the track groove 111 and the load track groove 125 caused by the balls 150 can be suppressed or prevented.

The reinforcement bush part is provided between the track grooves 111 of the spline shaft 110. A plurality of reinforcement bush parts is provided. The reinforcement bush parts are provided alternately with the spline parts.

Hereinafter, an example will be described, in which two track grooves 111 are formed so as to be opposite to each other and spaced apart from each other at an angle of 180°, two spline parts are provided, and two reinforcement bush parts are positioned between the spline parts.

The reinforcement bush part includes at least one concave bush track groove 125-1 formed in the longitudinal direction on the inner surface part 121 of the nut 120, and at least one bush circulation part 127-1 formed in parallel to the bush track groove 125-1 at a position spaced apart from the bush track groove 125-1 in the longitudinal direction. The bush track groove 125-1 is provided so as to face the outer surface of the spline shaft 110. The bush circulation part 127-1 may be formed as a through hole formed in the nut 120 in the longitudinal direction of the nut 120.

A curvedly concave bush circulation groove 133-1 is formed on the inner surface of each of the retainers 130, which faces the nut 120. At least one bush circulation groove 133-1 is formed. The bush circulation groove 133-1 is formed between the spline circulation grooves 133. One side of the bush circulation groove 133-1 faces the end portion of the bush track groove 125-1 and the other side faces the end portion of the bush circulation part 127-1.

The others of the balls 150 are diverted in the bush circulation grooves 133-1 of the retainers 130, which are provided on both sides in the longitudinal direction, roll between the outer surface of the spline shaft 110 and the bush track groove 125-1, are diverted in the bush circulation grooves 133-1 so as to be guided into the bush circulation part 127-1, thereby moving along the bush circulation grooves 133-1 and circulating.

As shown in FIG. 4, extended track extension parts are formed at both end portions of the bush track groove 125-1 in the longitudinal direction. When the balls 150 move and reach the track extension parts, the clearance for the balls 150 increases in the track extension parts 125a so that the balls 150 can smoothly move to the bush circulation grooves 133-1 of the retainers 130 and, accordingly, damage to the bush track groove 125-1 caused by the balls 150 can be suppressed or prevented.

As shown in FIG. 5, an inner surface part 131 of the retainer is formed in a cylindrical shape, and the spline circulation groove 133 and the bush circulation groove 133-1 are opened to the retainer inner surface part 131 so as to have an inner surface opening 135 opened to the retainer inner surface part 131 from an inner diameter side. Therefore, the retainer 130 does not have any element that is provided on the radially inner side of the retainer 130 so as to protrude inward from the retainer inner surface part 131, and interference with the track groove 111 does not occur while the retainer 130 moves, so that damage to the retainer 130 does not occur due to the interference with the track groove 111.

The diameter of the balls 150 provided in the ball spline 100 having reinforcement bush parts according to the present invention is provided to be greater than a gap between the load track groove 125 of the nut 120 and the track groove 111 and than a gap between the bush track groove 125-1 and the outer surface of the spline shaft 110. Accordingly, preload is generated between the load track groove 125 and the track groove 111 and between the bush track groove 125-1 and the outer surface of the spline shaft 110.

The gap between the bush track groove 125-1 and the outer surface of the spline shaft 110 is formed to be larger than the gap between the load track groove 125 and the track groove 111, and assembly is carried out such that the preload acting on the balls 150 between the outer surface of the spline shaft 110 and the bush track groove 125-1 is smaller than the preload acting on the balls 150 between the track part 111 and the load track groove 125. The reinforcement bush part is assembled with a smaller preload than the spline part but has a phase of 90° with respect to the spline part, as shown in FIG. 7, so that the load bearing capacity in the right angle direction is maximized. In addition, the reinforcement bush part is provided and supported without the formation of the track groove 111 in the right angle direction, thereby preventing decrease in the rigidity of the spline shaft 110 due to the processing of the track groove 111.

Therefore, the ball spline 100 according to the present invention is provided with reinforcement bush parts, so that the rigidity against the radial load acting on the nut 120 ("A" direction in FIG. 7) is improved, thereby improving the lifespan of the ball spline.

Hereinabove, the ball spline having reinforcement bush parts according to the present invention has been described with reference to the embodiments shown in the drawings, which are only exemplary, and it will be understood by those skilled in the art that various modifications and equivalent other embodiments may be made thereto. Accordingly, the true technical protection scope should be determined by the technical spirit of the appended claims.

INDUSTRIAL APPLICABILITY

The ball spline having reinforcement bush parts according to the present invention has high rigidity and thus the lifespan thereof is extended.

The invention claimed is:
1. A ball spline (100) having reinforcement bush parts, comprising:
a rod-shaped spline shaft (110) having two concave track grooves (111) formed to extend in the longitudinal direction thereof;

a nut part in which the spline shaft (110) is inserted so that the nut part can move in the longitudinal direction of the spline shaft; and a plurality of balls (150) provided between the nut part and the spline shaft (110) so as to circulate, wherein the nut part includes a nut (120) which is a hollow body into which the spline shaft (110) is inserted, and retainers (130), which are hollow bodies provided at both sides of the nut (120) in the longitudinal direction of the nut (120) and into which the spline shaft (110) is inserted;

wherein the nut part is provided with two spline parts;

wherein each of the spline parts includes:

a concave load track groove (125), which is formed in the longitudinal direction on an inner surface part (121) of the nut (120) so as to face a corresponding one of the track grooves (111), a no-load circulation part (127) formed in parallel to the load track groove (125) in the longitudinal direction, and a curved concave spline circulation groove (133), which is formed in each of the retainers (130) and has one side facing the end portion of the load track groove (125) and the other side facing the end portion of the no-load circulation part (127);

wherein some of the balls (150) are diverted in the spline circulation grooves (133) of the retainers (130) which are provided on both sides in the longitudinal direction, and circulate and move between the track grooves (111) and the load track grooves (125) and along the no-load circulation parts (127);

wherein the nut part further includes two reinforcement bush parts in parallel with the spline parts;

wherein the remainder of the balls (150) roll in contact with the outer surface of the spline shaft (110) and circulate and move along the reinforcement bush parts;

wherein the two track grooves (111) are provided at positions opposite to each other, and the reinforcement bush parts are provided alternatively with the spline parts so that each of the reinforcement bush parts is positioned between the spline parts, with a phase of 90° with respect to each of the spline parts; and wherein a gap between a bush track groove (125-1) and the outer surface of the spline shaft (110) is formed to be larger than a gap between each of the load track grooves (125) and each of the track grooves (111), so that a preload acting on the balls (150) between the outer surface of the spline shaft (110) and the bush track groove (125-1) is smaller than a preload acting on the balls (150) between each of the track grooves (111) and each of the load track grooves (125).

2. The ball spline (100) according to claim 1, wherein:

each of the reinforcement bush parts includes the bush track groove (125-1) formed in the longitudinal direction on the inner surface part (121) of the nut (120) so as to face the outer surface of the spline shaft (110), a bush circulation part (127-1) formed in parallel to the bush track groove (125-1) in the longitudinal direction, and a curved concave bush circulation groove (133-1) formed in each of the retainers (130) and having one side facing the end portion of the bush track groove (125-1) and the other side facing the end portion of the bush circulation part (127-1); and the plurality of balls (150) that circulate and move along the reinforcement bush parts are diverted in the bush circulation grooves (133-1) of the retainers (130) which are provided on both sides in the longitudinal direction and circulate and move between the outer surface of the spline shaft (110) and the bush track grooves (125-1) and along the bush circulation parts (127-1).

\* \* \* \* \*